Figures 1, 2:
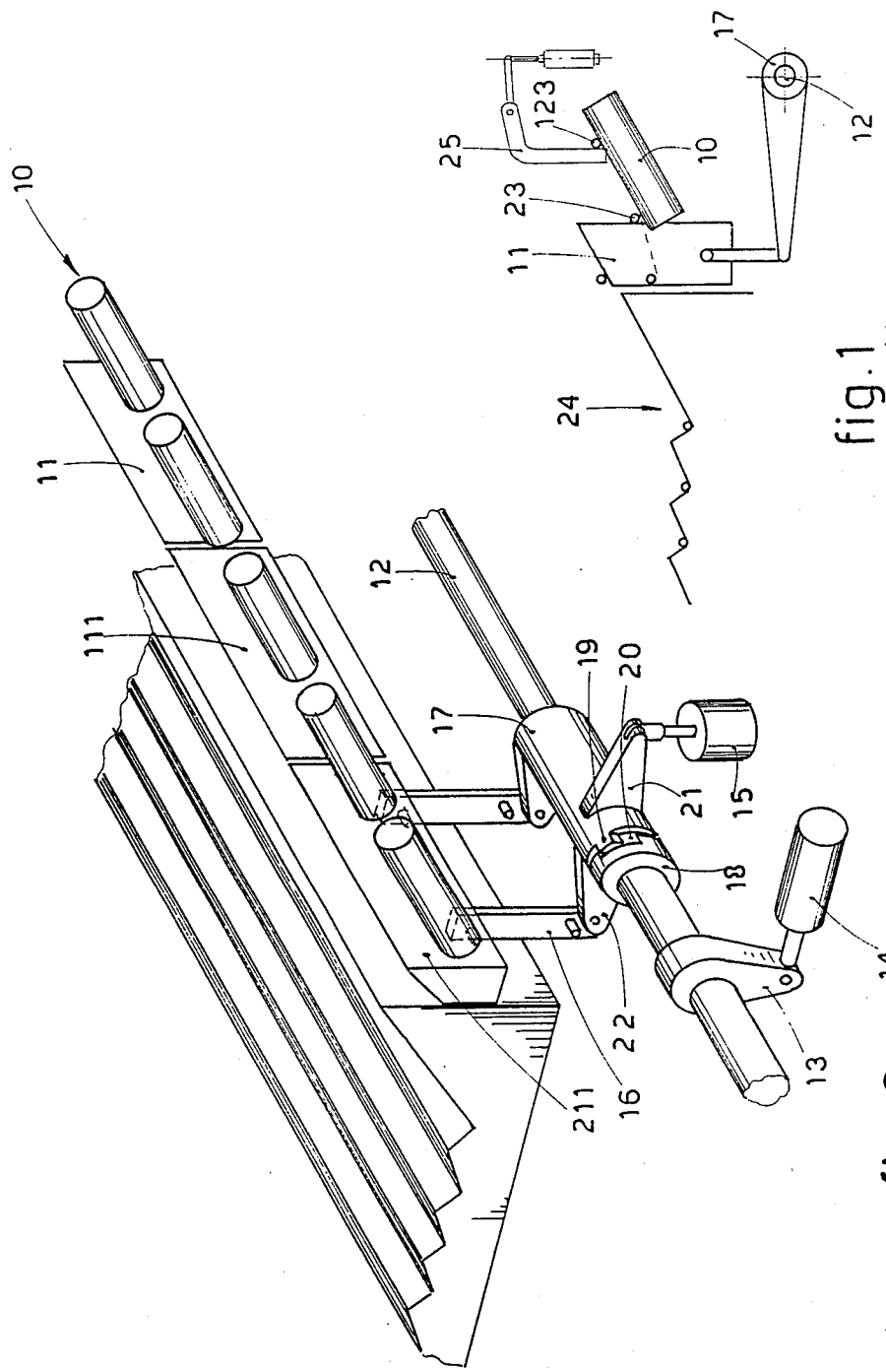

United States Patent [19]

Rizzi

[11] Patent Number: 4,895,246

[45] Date of Patent: Jan. 23, 1990

[54] DEVICE FOR THE RANDOM SELECTION OF SEGMENTS OF A MOVABLE WALL ON A ROLLER CONVEYOR

[75] Inventor: Italo Rizzi, Udine, Italy

[73] Assignee: Danieli & C. Officine Meccaniche SPA, Buttrio, Italy

[21] Appl. No.: 217,900

[22] Filed: Jul. 12, 1988

[30] Foreign Application Priority Data

Jul. 31, 1987 [IT] Italy ................................ 83421 A/87

[51] Int. Cl.$^4$ ............................................. B65G 39/00
[52] U.S. Cl. .................................. 198/463.4; 198/368; 198/463.5; 414/745.9; 414/746.1; 414/746.4
[58] Field of Search ............... 198/359, 360, 366, 370, 198/368, 457, 463.4, 463.5; 414/745.9, 746.1, 746.2, 746.4; 209/517, 518, 707

[56] References Cited

U.S. PATENT DOCUMENTS

| | | | |
|---|---|---|---|
| 1,398,818 | 11/1921 | Upp | 198/463.4 |
| 1,929,487 | 10/1933 | Feller | 198/457 |
| 3,880,751 | 4/1975 | Wirth | 198/366 |
| 4,505,374 | 3/1985 | Beerens et al. | 198/463.5 |

FOREIGN PATENT DOCUMENTS

| | | |
|---|---|---|
| 1527710 | 1/1970 | Fed. Rep. of Germany . |
| 2553538 | 4/1977 | Fed. Rep. of Germany . |
| 2313538 | 6/1976 | France . |

*Primary Examiner*—Joseph E. Valenza
*Attorney, Agent, or Firm*—Wegner & Bretschneider

[57] ABSTRACT

Device for the random selection of segments of a movable wall (11) on roller conveyors (10) which discharge rolled bars (23) laterally, whereby the movable wall (11) can descend and ascend in relationship with the roller conveyor (10) and a cooling plate (24), the roller conveyor (10) lying on a plane tilted towards the movable wall (11), the movable wall (11) being divided into a plurality of specific aligned segments (111, 211, ...) which succeed one another and are actuated by one single actuation shaft (12), actuation being imparted to individual specific elements or to desired assemblies of the specific elements.

10 Claims, 1 Drawing Sheet

DEVICE FOR THE RANDOM SELECTION OF SEGMENTS OF A MOVABLE WALL ON A ROLLER CONVEYOR

This invention concerns a device for the random selection of segments of a movable wall on a roller conveyor which discharges rolled bars.

To be more exact, the invention concerns a device suitable to make possible a random or desired selection of part or the whole of the movable wall of a roller conveyor which discharges rolled bars and cooperates with a cooling plate or other means.

At the present time the movable walls of roller conveyors discharging rolled bars consist of one or more segments, but all the segments are actuated together in the same manner.

The roller conveyors are titled and the retraction of the movable wall enables the rolled stock to slide sideways and thus to be discharged onto a cooling plate.

On such roller conveyors the problem often arises of having to discharge a segment of the rolled stock (the head of a bar, for instance) or one rolled element in a desired manner without interfering thereby with the other rolled elements sliding on the roller conveyor.

To do so with the known art, it is necessary to create perfect coordination between the arrival of the rolled stock to be discharged and the moment when the movable wall is made to descend and ascend, so that the previous rolled element and the subsequent one do not have to undergo the same action as the element which has to be discharged in a manner independent of the other elements.

With the known art it is possible to retain an arriving element by means of an appropriate hinged vane until the previous element has been discharged.

DE-OS-1527710 discloses a plurality of aligned, successive movable wall elements connected to one single shaft and actuated all together or in pre-selected assemblies. This proposal is an improvement as regards the state of the art but entails the shortcoming that the assemblies actuated at the same time are pre-selected and are not chosen on each occasion according to the actual braking requirements.

So as to be able to discharge the rolled stock from a roller conveyor in a random or desired manner without any need even of auxiliary hinged vanes, the present applicant has designed, tested and embodied the present invention, according to which the movable wall, which determines by its retraction the lateral discharge of the rolled stock, is divided into a number of successive independent segments.

According to the invention each independent segment can be moved in coordination with the other segments or be moved or clamped in an independent manner. The device is extremely simple and reliable.

The invention therefore consists of a device for the random selection of segments of a movable wall on a roller conveyor for the discharge of rolled stock and is characterized according to the main claim, the connected dependent claims disclosing variants of the basic idea.

Figure 1 shows a known hinged separation vane. Figure 2 shows a non-restrictive, simplified example of one embodiment of a device according to the invention.

A roller conveyor 10 with tilted rolls positioned crosswise to the roller conveyor cooperates with movable wall segments 11 in the lateral discharge of rolled bars 23 sliding on the roller conveyor 10.

Lateral discharge delivers the bars 23 onto a cooling plate 24 or other means.

The coordinated working of the movable wall segments 11 and the roller conveyor 10 in the discharge of rolled bars is already known and is not re-disclosed here.

In the known art a hinged vane 25 is provided to separate the head of one bar from another or one element from the successive element and retains momentarily a successive element 123 until the preceding element 23 has been discharged in a straight direction or laterally, depending on what the specific preceding element 23 is. This embodiment is unsatisfactory.

According to the invention a movable wall 11 is divided into a plurality of segments 111, 211, etc. positioned side by side in succession, each segment being independent of the preceding and successive segments.

Such independence or coordinated connection is a condition desired by the machine operator and is made possible by the invention.

An operating shaft 12 of a type known in itself is comprised in cooperation with the movable wall 11 and is actuated by a hydraulic cylinder 14 through a lever 13.

A frontal ring 18 which cooperates with a sleeve 17 is comprised for each movable wall segment 111, 211, and is solidly fixed to the shaft 12, whereas the sleeve 17 can oscillate on the shaft 12.

A frontal connection is provided between the frontal ring 18 and sleeve 17 by means of a slot 20 and tooth 19.

The positioning of the slot 20 and tooth 19 respectively on the ring 18 and/or on the sleeve 17 depends on the choice made during design work.

The slot 20 is considerably longer than the thickness of the tooth 19, so that the tooth 19 can move to a certain extent in a circumferential direction within the slot 20.

The sleeve 17 comprises one or more rear levers 22 cooperating with respective connecting rods 16 which act on one single movable wall segment 111, 211.

The sleeve 17 comprises also a frontal lever 21 cooperating with a pneumatic cylinder 15.

The method of working is so far implicit. Vertical actuation of the movable wall 11 is performed by the hydraulic cylinder 14, which by means of its force is able to overcome the thrust of the plurality of pneumatic cylinders 15 that normally keep the tooth 19 in working connection with the slot 20.

The actuation of the hydraulic cylinder 14, therefore, lowers or raises the movable wall segment 11 by coordinated movement with angular rotation of the shaft 12.

When it is desired to separate the movement of the specific segment of the movable wall 111 or 211 from the movement of the other specific elements, it is enough to act on the pneumatic cylinder 15, which in this case draws the frontal lever 21 towards itself and thrusts the rear lever 22 upwards.

In the meantime the tooth 19 is made to slide circumferentially within the slot 20. In this way the specific movable segment chosen is thrust upwards and kept up also during rotation of the shaft 12, which moves the other specific movable segments. In fact, the slot 20 is not able to engage the tooth 19.

If so desired, the position of the specific movable segment 11 can be inverted very simply by inverting the coordinated relationship between the tooth 19 and slot 20.

The movable wall segments 11 may be of various types and have a varied type of coordinated relationship with the roller discharge conveyor 10 and plate 24.

I claim:

1. A device for the random selection of segments of a movable wall on a roller conveyor which discharges rolled bars laterally to a cooling plate, comprising:
   a movable wall for descending and ascending relative to a roller conveyor to laterally discharge rolled bars to a cooling plate, said movable wall including a plurality of segments positioned side-by-side in succession, each said segment being vertically movable; and
   movement means for vertically moving the segments in a coordinated or independent manner, said movement means including an operating shaft and means for rotating the operating shaft through an angle to coordinately move said segments, and actuating means for independently moving each said segment, said actuating means including:
   a frontal ring fixed to said operating shaft, a sleeve operatively connected to the segment and supported on the operating shaft for independent oscillation to vertically move the segment, a frontal connection between the frontal ring and the sleeve for selectively engaging said sleeve to move with said operational shaft or disengaging said sleeve out of movement with said operational shaft, and thrust means for oscillating the sleeve through an angle.

2. A device as recited in claim 1, wherein said means for rotating the operating shaft through an angle comprises a hydraulic cylinder.

3. A device as recited in claim 2, wherein said movement means further comprises a lever operatively connecting said hydraulic cylinder to said operating shaft.

4. A device as recited in claim 1, wherein each said frontal connection comprises a slot in said frontal ring and a tooth on said sleeve, the slot length being longer than the tooth thickness.

5. A device as recited in claim 1, wherein each said thrust means comprises a pneumatic cylinder.

6. A device as recited in claim 1, wherein each said actuating means further comprises a frontal lever on said sleeve, said frontal lever operatively connecting said sleeve to said thrust means for oscillation.

7. A device as recited in claim 6, wherein each said actuating means further comprises a rear lever on said sleeve, and a connecting rod operatively connecting said rear lever to the segment.

8. A device as recited in claim 7, wherein each said frontal connection comprises a slot in said frontal ring and a tooth on said sleeve, the slot length being longer than the tooth thickness.

9. A device as recited in claim 1, wherein each said thrust means comprises a pneumatic cylinder having a thrusting force, and said means for rotating the operating shaft through an angle comprises a hydraulic cylinder having a thrusting force greater than the combined thrusting force of every said pneumatic cylinder.

10. A device as recited in claim 9, wherein each said frontal connection comprises a slot in said frontal ring and a tooth on said sleeve, the slot length being longer than the tooth thickness.

* * * * *